(12) United States Patent
Glose

(10) Patent No.: US 11,689,139 B2
(45) Date of Patent: Jun. 27, 2023

(54) METHOD FOR CONTROLLING A MULTI-PHASE ELECTRIC MACHINE BY WAY OF SPACE VECTOR MODULATION, CONTROL DEVICE, AND DRIVE ARRANGEMENT

(71) Applicant: Bayerische Motoren Werke Aktiengesellschaft, Munich (DE)

(72) Inventor: Daniel Glose, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 113 days.

(21) Appl. No.: 17/425,086

(22) PCT Filed: Mar. 18, 2020

(86) PCT No.: PCT/EP2020/057402
§ 371 (c)(1),
(2) Date: Jul. 22, 2021

(87) PCT Pub. No.: WO2020/212058
PCT Pub. Date: Oct. 22, 2020

(65) Prior Publication Data
US 2022/0109392 A1 Apr. 7, 2022

(30) Foreign Application Priority Data
Apr. 18, 2019 (DE) .................... 10 2019 110 269.3

(51) Int. Cl.
*H02P 27/08* (2006.01)
*H02P 23/00* (2016.01)

(52) U.S. Cl.
CPC .............. *H02P 27/08* (2013.01); *H02P 23/00* (2013.01)

(58) Field of Classification Search
CPC .......... H02P 27/00; H02P 27/04; H02P 27/06; H02P 27/08; H02P 27/085; H02P 21/00;
(Continued)

(56) References Cited

U.S. PATENT DOCUMENTS

| | | | |
|---|---|---|---|
| 9,917,543 B1 * | 3/2018 | Sarlioglu | ................ H02P 25/22 |
| 2001/0054882 A1 * | 12/2001 | Nakamura | ............ H02J 7/1492 |
| | | | 322/28 |

(Continued)

FOREIGN PATENT DOCUMENTS

| | | |
|---|---|---|
| DE | 10 2007 011 146 A1 | 9/2008 |
| DE | 10 2012 210 670 A1 | 12/2013 |

(Continued)

OTHER PUBLICATIONS

International Search Report (PCT/ISA/210) issued in PCT Application No. PCT/EP2020/057402 dated Jun. 3, 2020 with English translation (four (4) pages).

(Continued)

*Primary Examiner* — Antony M Paul
(74) *Attorney, Agent, or Firm* — Crowell & Moring LLP

(57) ABSTRACT

A method is provided for controlling a multi-phase electric machine, wherein a stator of the electric machine includes a first sub-system and a second sub-system having the same number of phases and separate star points. The method includes controlling an inverter device by way of space vector modulation in order to generate output voltages for each of the phases, and outputting the output voltages as pulse sequences, wherein each of the pulse sequences in the second sub-system is output inverted with respect to respective pulse sequence in the first sub-system.

9 Claims, 2 Drawing Sheets

(58) Field of Classification Search
CPC .......... H02P 21/22; H02P 21/28; H02P 21/34; H02P 23/00; H02P 23/07; H02P 23/28; H02P 25/00; H02P 25/022; H02P 25/03; H02P 25/032; H02P 25/034; H02P 25/062; H02P 25/064; H02P 25/08; H02P 25/089; H02P 25/092; H02P 25/10; H02P 25/102; H02P 25/14; H02P 25/12; H02P 6/00; H02P 6/08; H02P 6/085; H02P 6/187; H02P 6/28; H02P 7/29; H02P 1/00; H02P 1/18

See application file for complete search history.

(56) References Cited

U.S. PATENT DOCUMENTS

| | | | |
|---|---|---|---|
| 2016/0190972 A1 | 6/2016 | Mori et al. |
| 2018/0278144 A1 | 9/2018 | Nakano et al. |

FOREIGN PATENT DOCUMENTS

| | | |
|---|---|---|
| DE | 10 2014 210 627 A1 | 12/2015 |
| DE | 11 2016 000 520 T5 | 12/2017 |

OTHER PUBLICATIONS

German-language Written Opinion (PCT/ISA/237) issued in PCT Application No. PCT/EP2020/057402 dated Jun. 3, 2020 (four (4) pages).

German-language Search Report issued in German Application No. 10 2019 110 269.3 dated Feb. 19, 2020 with an English translation (11 pages).

\* cited by examiner

METHOD FOR CONTROLLING A MULTI-PHASE ELECTRIC MACHINE BY WAY OF SPACE VECTOR MODULATION, CONTROL DEVICE, AND DRIVE ARRANGEMENT

BACKGROUND AND SUMMARY OF THE INVENTION

The invention relates to a method for controlling a multi-phase electric machine, wherein a stator of the electric machine has a first subsystem and a second subsystem with the same number of phases and separate star points. In the method, in order to generate output voltages for the respective phases, an inverter apparatus is controlled by way of space vector modulation. The output voltages are also output as a respective pulse sequence. The present invention also relates to a control device and to a drive arrangement. Finally, the invention relates to a computer program.

Electric machines are used as drive motors in vehicles. In this respect, the prior art discloses the fact that multi-phase electric machines are used. In this case, an inverter is usually used to simulate the multi-phase three-phase system. In this case, the inverter can be operated using the space vector modulation method on the basis of pulse width modulation. The inverters have, for each phase, a half-bridge which can be used to connect the respective output of the inverter to a positive or negative intermediate circuit voltage. The respective output voltages of the inverter are therefore output as pulse sequences.

In this respect, DE 10 2012 210 670 A1 describes a method for controlling an inverter by way of space vector modulation, wherein the inverter has a plurality of controllable switches. In this case, the inverter is controlled in order to set up a plurality of successive different switching states of the switches in a pulse-width-modulated manner.

In the case of multi-phase electric machines with separate star points, compensation currents may be produced on the phases when generating zero voltage vectors. These compensation currents have a very low amplitude but have great effects on the durability of the rotor bearings and the electromagnetic compatibility.

The object of the present invention is to show a solution of how a multi-phase electric machine can be controlled, such that damage to the electric machine is minimized and interference is reduced.

This object is achieved, according to the invention, by way of a method, a control device, a drive arrangement and a computer program having the features according to the claimed invention.

A method according to embodiments of the invention is used to control a multi-phase electric machine, wherein a stator of the electric machine has a first subsystem and a second subsystem with the same number of phases and separate star points. In the method, in order to generate output voltages for the respective phases, an inverter apparatus is controlled by way of space vector modulation. In this case, the output voltages are output as respective pulse sequences. In this case, provision is made for the respective pulse sequences in the second subsystem to be output in an inverted manner with respect to the respective pulse sequences in the first subsystem.

The method is intended to be used to control an electric machine for a vehicle. This electric machine can be used as a drive motor in a vehicle which is driven in an at least partially electric manner. The electrical machine which is intended to be controlled has a multi-phase design or has a plurality of phases in the stator. The electric machine has the first subsystem and the second subsystem. In this case, each of the subsystems may have at least one phase. The subsystems preferably each have a plurality of phases. In this case, the number of phases in the first subsystem corresponds to the number of phases in the second subsystem. In this case, a strand of a winding may be assigned to each phase in the stator of the electric machine. These strands of the windings of a subsystem can be electrically connected to one another at the star point. In this case, the star points of the first subsystem and of the second subsystem are electrically isolated from one another.

The method can be carried out using a corresponding control device which can be used to control the inverter apparatus. The inverter apparatus is used to output the output voltages for the electric machine. In this case, the inverter apparatus may have at least one inverter. This inverter apparatus may be connected, on the input side, to an intermediate circuit. The intermediate circuit can be used to provide a positive intermediate circuit voltage and a negative intermediate circuit voltage. The inverter apparatus may have a half-bridge for each phase. Each of the half-bridges may in turn have an upper switching element and a lower switching element. These switching elements are controllable, in particular, and may be in the form of semiconductor switches. Each switch position produces a different voltage configuration between the phases and therefore also a different voltage space vector. Pulse width modulation is used to provide the voltage space vectors. Voltage pulses or pulse sequences are output at the respective outputs of the inverter apparatus. These pulse sequences are applied to the respective phases in order to generate the voltage space vectors.

According to one important aspect of the invention, provision is made for the pulse sequences in the second subsystem to be output in an inverted manner with respect to the pulse sequences in the first subsystem. The pulse sequences describe the fact that two different voltages, for example, are output according to a predetermined temporal sequence. In the present case, the term "inverted" should be understood as meaning the fact that, if the first voltage is output for a particular period in a pulse sequence in the first subsystem, the second voltage is output for the same period in the second subsystem. The pulse sequences on the phases may result in compensation currents in the first subsystem and in the second subsystem. This inverted control makes it possible to achieve the situation in which the compensation currents in the second subsystem at least partially compensate for the compensation currents in the first subsystem. The pulse sequences in the second subsystem are therefore temporally offset with respect to the pulse sequences in the first subsystem such that the pulse sequence in the second subsystem corresponds to the inverted pulse sequence of the first subsystem. This makes it possible to prevent or at least reduce a flow of electric current through the rotor bearing. No additional components or no additional hardware is/are needed to control the inverter apparatus since a corresponding control device is usually present for control. Overall, damage to the rotor bearings of the electric machine can be reduced. Furthermore, the electromagnetic interference can be reduced.

In one embodiment, the respective pulse sequences describe a first zero voltage vector and a second zero voltage vector, wherein the first zero voltage vector is output in the first subsystem if the second zero voltage vector is output in the second subsystem, and the second zero voltage vector is output in the first subsystem if the first zero voltage vector is output in the second subsystem. The two positions of the switching elements of the inverter apparatus, in which either all upper or all lower switching elements are closed, are used to generate the so-called zero voltage vectors. The respective phases of a subsystem are short-circuited in these switch positions. Therefore, there is no potential difference between the phases of the subsystem. These zero voltage vectors may also be referred to as zero voltage space vectors or passive voltage space vectors. The other voltage space vectors which differ from the zero voltage vectors may be referred to as active voltage space vectors. Provision is now made for the second zero voltage vector to be output in the second subsystem if the first zero voltage vector is output in the first subsystem and vice versa. This makes it possible to considerably reduce compensation currents. Measurements have shown here that the loads on account of electromagnetic interference could be reduced by up to 90%.

Each phase of the first subsystem is preferably assigned a corresponding phase of the second subsystem, wherein the pulse sequences of the phases of the first subsystem are inverted for the corresponding phases of the second subsystem. As already explained, the number of phases in the first subsystem corresponds to the number of phases in the second subsystem. In this case, each phase in the first subsystem may be assigned a corresponding phase in the second subsystem. If, for example, a first pulse sequence is fed into a first phase of the first subsystem, the pulse sequence inverted with respect to the first pulse sequence can be fed into the corresponding first phase of the second subsystem. This applies to all phases of the first subsystem and to the corresponding phases of the second subsystem. This makes it possible to achieve the situation in which the compensation currents of the first subsystem and of the second subsystem compensate for one another.

In a further embodiment, a positive intermediate circuit voltage and a negative intermediate circuit voltage are output in the respective pulse sequences. The inverter apparatus may be connected, on the input side, to an intermediate circuit. This intermediate circuit is designed, in particular, in such a manner that it can be used to provide the positive intermediate circuit voltage and the negative intermediate circuit voltage. For example, this intermediate circuit may have two capacitors, wherein a center tap between the capacitors is connected to ground. The positive intermediate circuit voltage and the negative intermediate circuit voltage are DC voltages. In particular, provision is made for the absolute value of the positive intermediate circuit voltage to correspond to the absolute value of the negative intermediate circuit voltage. It can therefore be assumed that the absolute value of the compensation currents in the two subsystems is also identical. This makes it possible to compensate for the compensation currents as completely as possible.

In a further embodiment, the pulse sequences in the respective subsystems are output in such a manner that they are symmetrical in a centered manner. This means that the pulses for the respective phases can differ from one another in terms of the pulse duration. In this case, the pulses are output in such a manner that the times correspond to half the pulse duration. If the output voltages are symmetrically modulated in a centered manner, there is the advantage that the current distortion in the phases can be reduced. However, there is also the disadvantage that the effect of the compensation currents is greatest. This disadvantage can be countered by outputting the output voltages in the second subsystem in an inverted manner with respect to the output voltages in the first subsystem. This makes it possible to achieve the situation in which the compensation currents between the first subsystem and the second subsystem are compensated for.

A control device according to embodiments of the invention is used to control an inverter apparatus for an electric machine. The control device is designed to carry out a method according to the invention and the advantageous configurations thereof. The control device may be provided by a processor, a digital signal processor, a computer, a control unit or the like. The control device can be used to output control signals for the respective switching elements of the inverter apparatus.

A drive arrangement according to embodiments of the invention for a vehicle comprises a control device according to the invention. In addition, the drive arrangement comprises an inverter apparatus and an electric machine. The control device can be used to control the inverter apparatus or the switching elements of the inverter apparatus. The drive apparatus may also have an intermediate circuit which can be used to provide a positive intermediate circuit voltage and a negative intermediate circuit voltage. The inverter apparatus may be connected, on the input side, to the intermediate circuit and, on the output side, to the electric machine or the phases of the electric machine.

The electric machine preferably has a six-phase design. This means that the first subsystem may have three phases and the second subsystem may have three phases. In this case, the three phases of the first subsystem may be connected to a first star point and the three phases of the second subsystem may be connected to a second star point. In this case, the first star point and the second star point are electrically isolated from one another. A six-phase electric machine makes it possible to provide an efficient drive for a vehicle. In principle, the electric machine or the stator of the electric machine may also have a different number of phases.

In a further embodiment, the inverter apparatus comprises a first inverter for the first subsystem and a second inverter for the second subsystem. Each of the inverters may have a half-bridge for each of the phases. In addition, each of the inverters may have an output for each of the phases. The respective inverters may each have two controllable switching elements, for example transistors, thyristors or the like, in the half-bridges. These switching elements can then be controlled and therefore opened or closed by way of the control device.

A vehicle according to embodiments of the invention comprises a drive arrangement according to the invention. The vehicle may be a vehicle which is driven in an at least partially electric manner. The vehicle may be in the form of an electric vehicle or a hybrid vehicle. The electric machine may be a drive motor of the vehicle. The vehicle is preferably in the form of an automobile. Provision may also be made for the vehicle to be in the form of a commercial vehicle.

A computer program according to embodiments of the invention comprises instructions which, when the program is executed by a control device, cause the latter to carry out a method according to the invention and the advantageous embodiments thereof.

A further aspect of the invention relates to a computer-readable (storage) medium comprising instructions, which when executed by a control device, cause the latter to carry out a method according to the invention and the advantageous embodiments thereof.

The preferred embodiments presented with respect to the method according to the invention and their advantages accordingly apply to the control device according to the invention, the drive arrangement according to the invention, the vehicle according to the invention, the computer program product according to the invention and the computer-readable (storage) medium according to the invention.

Further features of the invention emerge from the claims, the figures and the description of the figures. The features and combinations of features mentioned above in the description and the features and combinations of features mentioned below in the description of the figures and/or shown in the figures alone can be used not only in the respectively stated combination, but also in other combinations or alone.

The invention is now explained in more detail on the basis of a preferred exemplary embodiment and with reference to the drawings.

DETAILED DESCRIPTION OF THE DRAWINGS

In the figures, identical or functionally identical elements are provided with the same reference signs.

Figure 1:
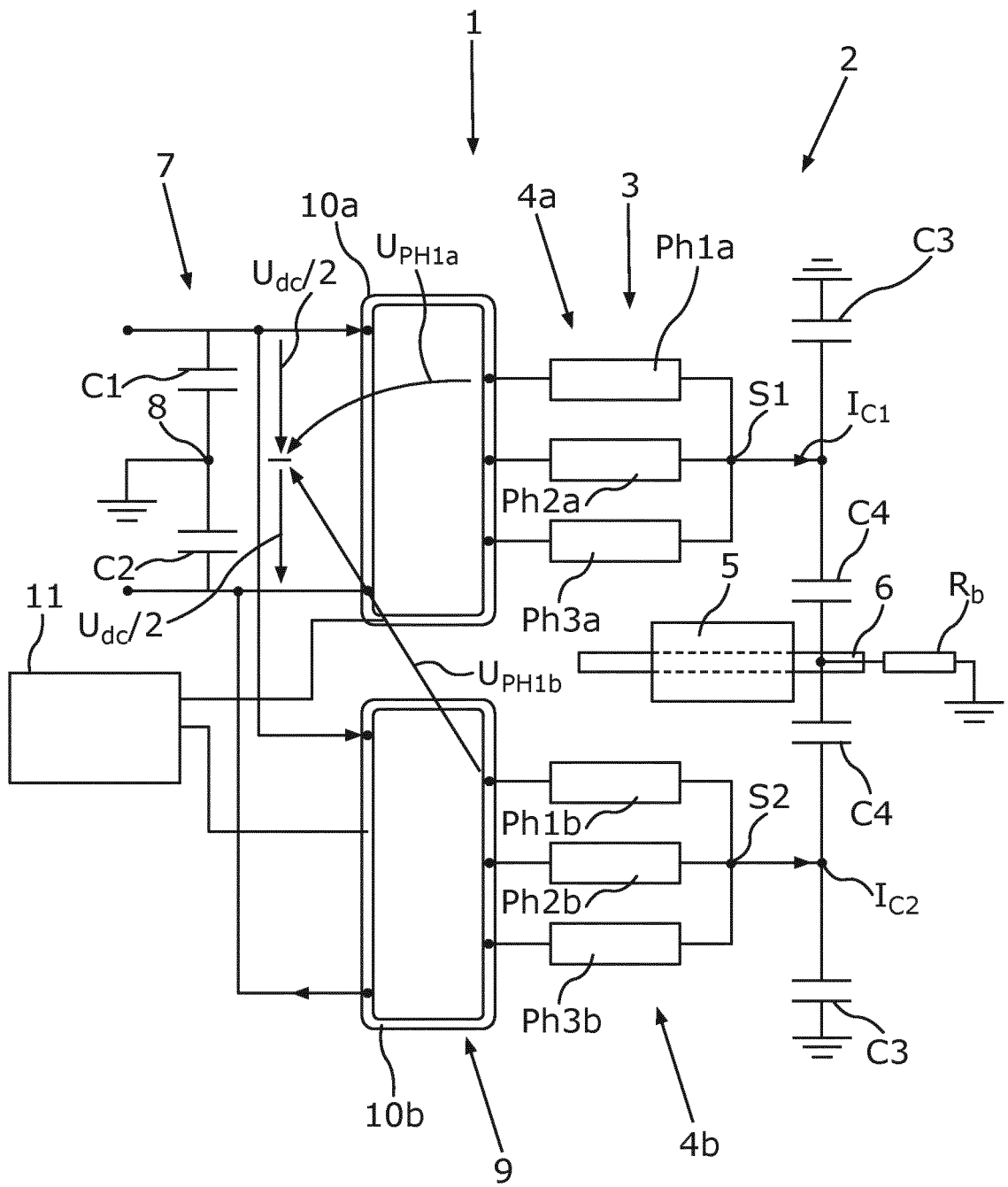
FIG. 1 shows a schematic illustration of a drive arrangement for a vehicle, wherein the drive arrangement has a six-phase electric machine.

FIG. 1 shows a schematic illustration of a drive arrangement 1 which can be used in a vehicle which is driven in an at least partially electric manner. The drive arrangement 1 comprises a multi-phase electric machine 2. In the present case, the electric machine 2 has a six-phase design. The electric machine 2 comprises a stator 3 having a first subsystem 4a and a second subsystem 4b. In this case, three phases Ph1a, Ph2a and Ph3a are assigned to the first subsystem 4a and three phases Ph1b, Ph2b and Ph3b are assigned to the second subsystem 4b. In this case, the phases Ph1a, Ph2a and Ph3a of the first subsystem 4a are connected to a first star point S1 and the phases Ph1b, Ph2b and Ph3b of the second subsystem 4b are connected to a second star point S2. In this case, the star points S1, S2 are separate from one another and are not electrically connected. The electric machine 2 also comprises a rotor 5 which has a shaft 6 and is rotatable with respect to the stator 3. This shaft 6 is rotatably mounted using a bearing or a rotor bearing.

The drive arrangement 1 also comprises an intermediate circuit 7 having a first capacitor C1 and a second capacitor C2. A center tap 8 is provided between the first capacitor C1 and the second capacitor C2 and is connected to ground. A voltage drop of $U_{dc}/2$ is produced across the respective capacitors C1, C2. The drive arrangement 1 also comprises an inverter apparatus 9 comprising a first inverter 10a and a second inverter 10b. In this case, the first inverter 10a is assigned to the first subsystem 4a and the second inverter 10b is assigned to the second subsystem 4b. The respective inverters 10a, 10b have a half-bridge having an upper switching element and a lower switching element for each of the phases Ph1a, Ph2a, Ph3a, Ph1b, Ph2b and Ph3b.

The drive arrangement 1 also comprises a control device 11 which is used to control the inverter apparatus 9 or the inverters 10a, 10b. The control device 11 can be used to transmit control signals to the respective switching elements of the inverters 10a, 10b. These control signals can be used to open or close the switching elements. In this case, provision is made for the control device 11 to control the inverters 10a, 10b or the switching elements of the inverters 10a, 10b by way of space vector modulation. A pulse sequence is output at the respective inverters 10a, 10b as an output voltage.

Figure 2:
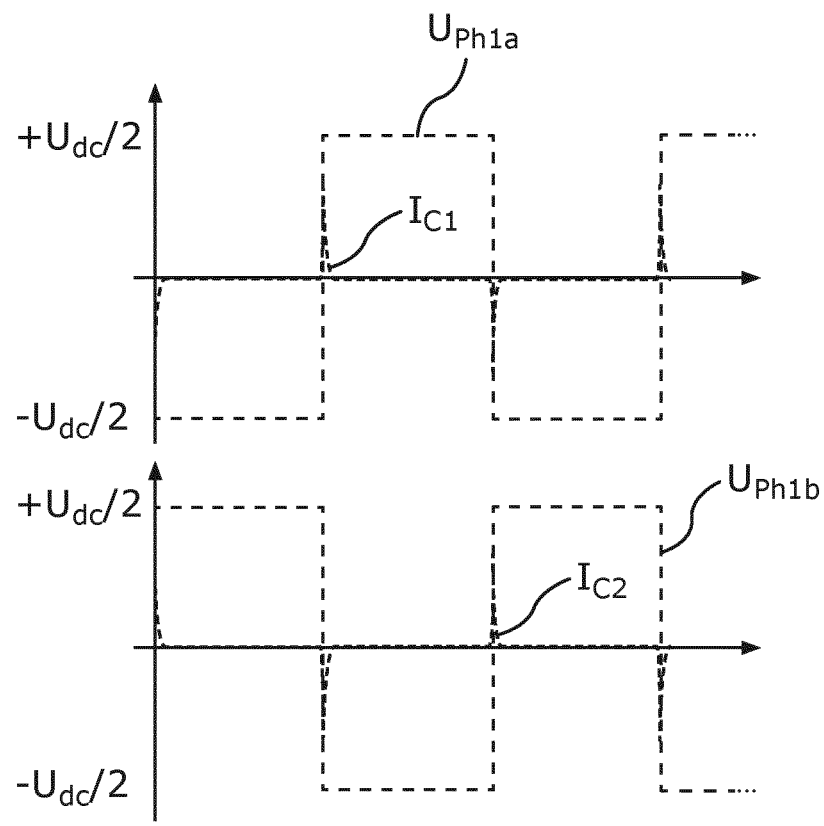
FIG. 2 shows a pulse sequence which is fed into a phase of a first subsystem of the electric machine, and a pulse sequence which is fed into a phase of a second subsystem of the electric machine.

In this respect, the upper region of FIG. 2 shows, by way of example, a pulse sequence $U_{Ph1a}$, which is used to control the first phase Ph1a of the first subsystem 4a, as a function of the time t. This pulse sequence $U_{Ph1a}$ changes, by way of example, between a positive intermediate circuit voltage $+U_{dc}/2$ and a negative intermediate circuit voltage $-U_{dc}/2$. In this example, the positive intermediate circuit voltage $+U_{dc}/2$ is generated by outputting a first zero voltage vector and the negative intermediate circuit voltage $-U_{dc}/2$ is generated by outputting a second zero voltage vector. In order to output the first zero voltage vector, all upper switching elements in the first inverter 10a are closed, for example, and, in order to output the second zero voltage vector, all lower switching elements in the first inverter 10a are closed, for example.

There is no voltage difference between the phases Ph1a, Ph2a and Ph3a in the first subsystem 4a when generating the respective zero voltage vectors. This control or this pulse sequence $U_{Ph1a}$ results in a compensation current $I_{C1}$ in the first subsystem 4a. As can be seen in the equivalent circuit diagram of the electric machine 2 from FIG. 1, the subsystems 4a, 4b of the stator 3 are capacitively coupled to ground. This is illustrated in the present case by the capacitors C3. Capacitive coupling which is described by the capacitors C4 also results between the stator 3 or the subsystems 4a, 4b and the rotor 5.

The compensation current $I_{C1}$ in the first subsystem 4a alone would result in a flow of current to ground via the rotor bearing as a result of the capacitive coupling between the first subsystem and the rotor 5. In the equivalent circuit diagram, the rotor bearing is described by the resistor $R_b$. This current through the rotor bearing would damage the rotor bearing. In addition, electromagnetic interference would result from the compensation current.

The lower region of FIG. 2 illustrates a pulse sequence $U_{Ph1b}$ or voltage which is used to control the first phase Ph1b in the second subsystem 4b. In this case, the first phase Ph1b in the second subsystem 4b corresponds to the first phase Ph1a in the first subsystem 4a. The pulse sequence also results in a compensation current $I_{C2}$ in the second subsystem 4b. As is clear from FIG. 2, the pulse sequence $U_{Ph1b}$ is an inverted pulse sequence with respect to the pulse sequence $U_{Ph1a}$. If the positive intermediate circuit voltage $+U_{dc}/2$ is applied to the first phase Ph1a in the first subsystem 4a, the negative intermediate circuit voltage $-U_{dc}/2$ is applied to the first phase Ph1b in the second subsystem 4b. If the negative intermediate circuit voltage $-U_{dc}/2$ is applied to the first phase Ph1a in the first subsystem 4a, the positive intermediate circuit voltage $+U_{dc}/2$ is applied to the first phase Ph1b in the second subsystem 4b. This results in the compensation currents $I_{C1}$ and $I_{C2}$ compensating for one another. This makes it possible to at least reduce the flow of current through the rotor bearing and to prevent damage to the rotor bearing.

Figure 3:
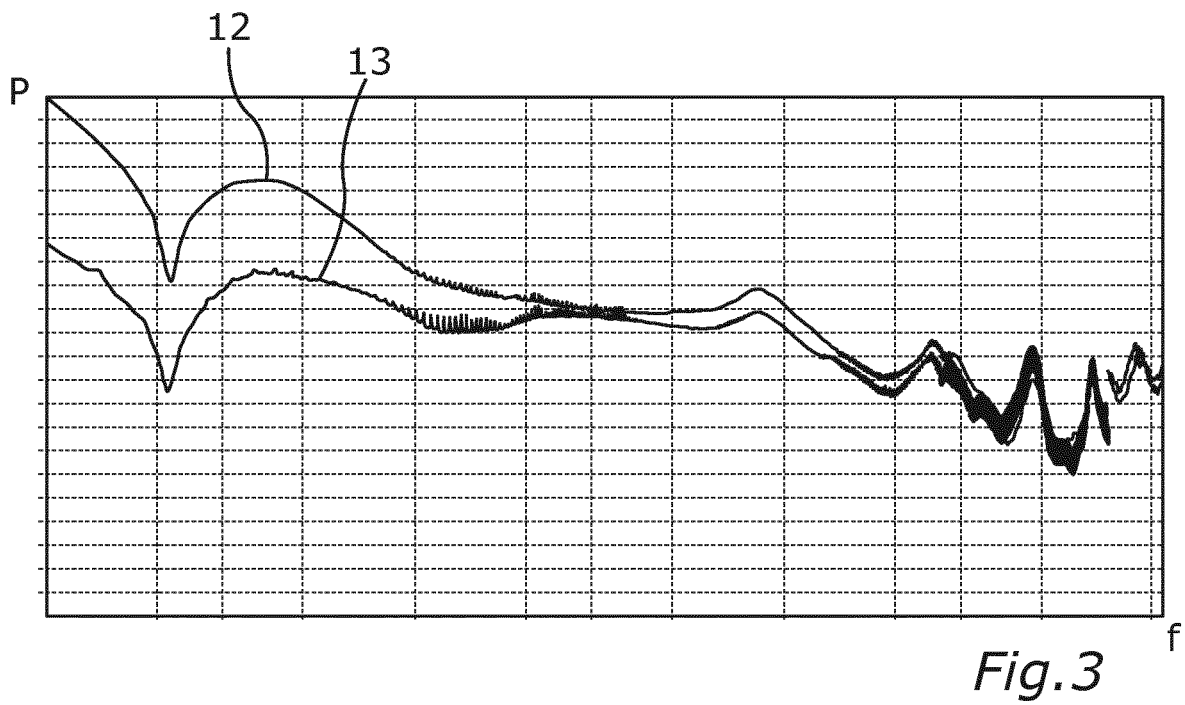
FIG. 3 shows measurements which describe the electromagnetic interference when controlling the electric machine according to the prior art and when controlling the electric machine in accordance with a method according to embodiments of the invention.

Furthermore, the electromagnetic compatibility (EMC) can be improved by way of the above-described control of the inverters 10*a*, 10*b*. In this respect, FIG. 3 shows a graph in which the frequency f is plotted on the abscissa and the level P in dB is plotted on the ordinate. In this case, a curve 12 describes the interference for controlling the electric machines 2 according to the prior art. During this control, the compensation currents $I_{C1}$ and $I_{C2}$ of the first subsystem 4*a* and of the second subsystem 4*b* do not compensate for one another. By comparison, a curve 13 shows the interference for control in which the pulse sequences $U_{Ph1a}$ and $U_{Ph1b}$ in the subsystems 4*a*, 4*b* are output in an inverted manner. The respective curves 12, 13 were determined during measurements in a drive train of a vehicle between a positive high-voltage connection and a negative high-voltage connection. When comparing the two curves 12 and 13, it can clearly be seen that the offset of the pulse sequences $U_{Ph1a}$ and $U_{Ph1b}$ with respect to one another can considerably reduce the interference. The electromagnetic compatibility can therefore be improved.

LIST OF REFERENCE SIGNS

1 Drive arrangement
2 Electric machine
3 Stator
4*a* First subsystem
4*b* Second subsystem
5 Rotor
6 Shaft
7 Intermediate circuit
8 Intermediate tap
9 Inverter apparatus
10*a*, 10*b* Inverter
11 Control device
12, 13 Curve
C1, C2, C3, C4 Capacitor
f Frequency
$I_{C1}$, $I_{C2}$ Compensation current
P Level
Ph1*a*, Ph2*a*, Ph3*a* Phase
Ph1*b*, Ph2*b*, Ph3*b* Phase
$R_b$ Resistor
S1, S2 Star point
t Time
$U_{dc}/2$ Intermediate circuit voltage
$U_{Ph1a}$, $U_{Ph1b}$ Voltage

What is claimed is:

1. A method for controlling a multi-phase electric machine, wherein a stator of the electric machine has a first subsystem and a second subsystem with a same number of phases and separate star points, the method comprising:
in order to generate output voltages for the respective phases, controlling an inverter apparatus by way of space vector modulation, and
outputting the output voltages as pulse sequences, wherein:
the pulse sequences in the second subsystem are output in an inverted manner with respect to respective pulse sequences in the first subsystem, and
a positive intermediate circuit voltage and a negative intermediate circuit voltage are output in the respective pulse sequences in the first subsystem.

2. The method according to claim 1, wherein:
the respective pulse sequences describe a first zero voltage vector and a second zero voltage vector,
the first zero voltage vector is output in the first subsystem if the second zero voltage vector is output in the second subsystem, and
the second zero voltage vector is output in the first subsystem if the first zero voltage vector is output in the second subsystem.

3. The method according to claim 1, wherein:
each phase of the first subsystem is assigned a corresponding phase of the second subsystem, and
the pulse sequences of the phases of the first subsystem are inverted for the corresponding phases of the second subsystem.

4. The method according to claim 1, wherein:
the pulse sequences in the respective subsystems are output such that the pulse sequences are symmetrical in a centered manner.

5. A control device for controlling an inverter apparatus for an electric machine, wherein stator of the electric machine has a first subsystem and a second subsystem with a same number of phases and separate star points, and the control device is configured to carry out a method comprising:
in order to generate output voltages for the respective phases, controlling an inverter apparatus by way of space vector modulation, and
outputting the output voltages as pulse sequences, wherein:
the pulse sequences in the second subsystem are output in an inverted manner with respect to respective pulse sequences in the first subsystem, and
a positive intermediate circuit voltage and a negative intermediate circuit voltage are output in the respective pulse sequences in the first subsystem.

6. A drive arrangement for a vehicle, the drive arrangement comprising:
a control device according to claim 5,
an inverter apparatus, and
an electric machine.

7. The drive arrangement according to claim 6, wherein:
the electric machine has a six-phase design.

8. The drive arrangement according to claim 6, wherein:
the inverter apparatus has a first inverter for the first subsystem and a second inverter for the second subsystem.

9. A computer product for controlling a multi-phase electric machine, wherein a stator of the electric machine has a first subsystem and a second subsystem with a same number of phases and separate star points, the computer product comprising a non-transitory computer readable medium having stored thereon program instructions which, when executed on a processor, carries out the acts of:
in order to generate output voltages for the respective phases, controlling an inverter apparatus by way of space vector modulation, and
outputting the output voltages as pulse sequences, wherein:
the pulse sequences in the second subsystem are output in an inverted manner with respect to respective pulse sequences in the first subsystem, and
a positive intermediate circuit voltage and a negative intermediate circuit voltage are output in the respective pulse sequences in the first subsystem.

* * * * *